J. G. POPPERT.
COUPLING FOR UNITING HOSE PIPES WITH FAUCETS.
APPLICATION FILED JAN. 12, 1912.
1,062,730.
Patented May 27, 1913.
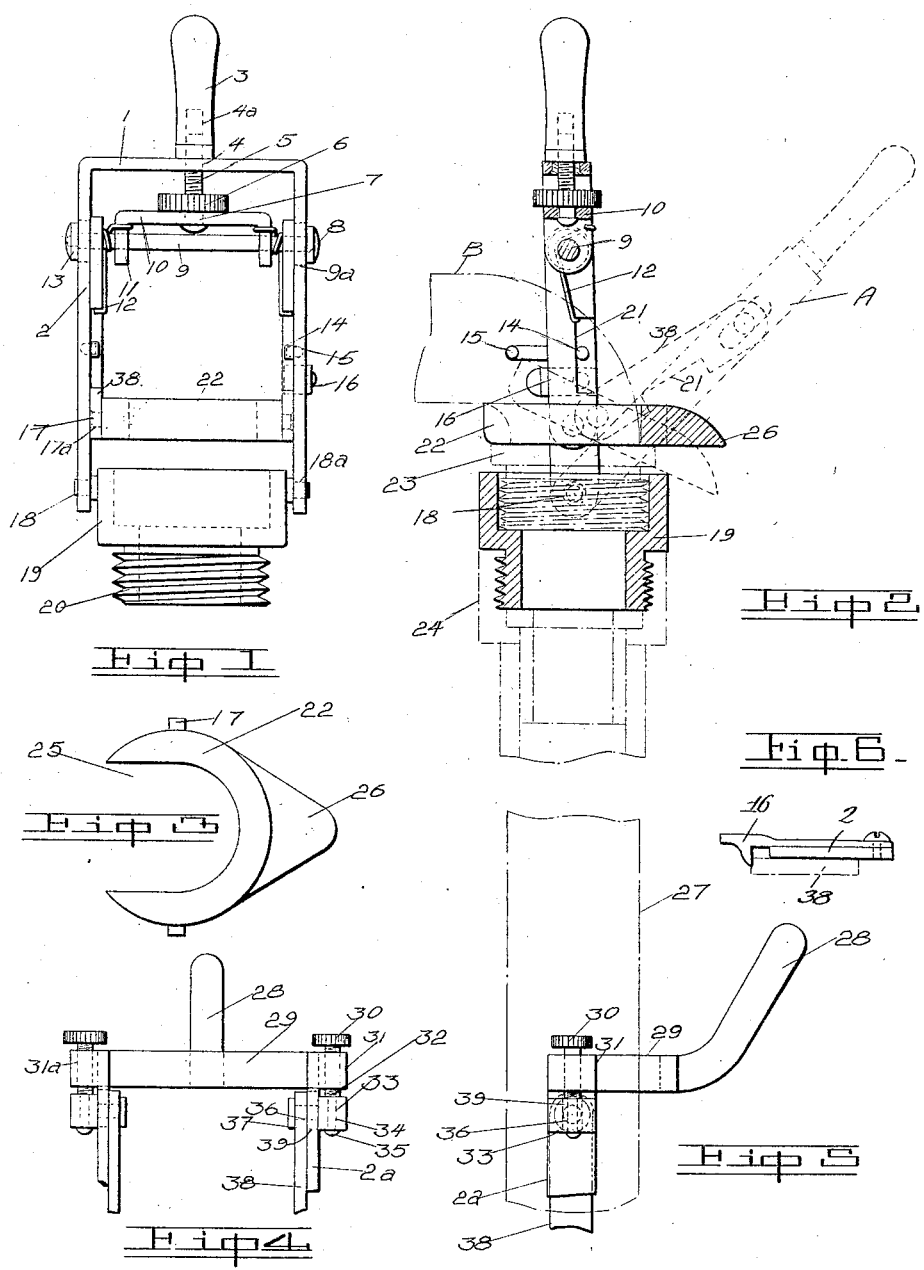
WITNESSES:
INVENTOR
Jesse G. Poppert.
BY
ATTORNEY

UNITED STATES PATENT OFFICE.

JESSE G. POPPERT, OF PORTLAND, OREGON.

COUPLING FOR UNITING HOSE-PIPES WITH FAUCETS.

1,062,730. Specification of Letters Patent. Patented May 27, 1913.

Application filed January 12, 1912. Serial No. 670,961.

*To all whom it may concern:*

Be it known that I, JESSE G. POPPERT, a citizen of the United States, residing at Portland, in the county of Multnomah and State of Oregon, have invented certain new and useful Improvements in Couplings for Uniting Hose-Pipes with Faucets, of which the following is a specification.

This invention relates to improvements in couplings, and particularly to that class employed in uniting hose pipes with faucets, or the like, and has for its object to provide a coupling which can be engaged in place by a single movement, and which may be disengaged by the reverse of that movement.

A further object is to provide a coupling for hose pipes and the like, which may be engaged upon the members to be united, by a single movement, and which will at the same time draw the united members together so as to prevent leakage therefrom. These objects are accomplished by the mechanism illustrated in the accompanying drawing, in which—

Figure 1 is a front elevation of the complete device. Fig. 2 is a sectional elevation showing the coupling secured upon a faucet, in full lines; and in dotted lines it is shown in position to be sprung into engagement. Fig. 3 is a detail view of a clamping member for engaging the faucet, or section of pipe. Fig. 4 is an elevation of a modified form, in which the device is adapted to unite sections of pipe. Fig. 5 is a side elevation of same. Fig. 6 is a detail of a spring catch.

Referring to the drawing in detail, 1 is the base or transverse portion of a U-shaped lever, having the side arms 2, and the handle 3 extending from the central point of the bar 1, at which point there is formed an aperture 4 which registers with a similar aperture 4ᵃ in the handle. Within said apertures is secured the screw threaded bolt 5, having fixed thereon near the outer end the thumb nut 6, by means of which the bolt is adjusted in the aperture. Upon the outer end of the bolt is loosely mounted, by a swivel connection, in the aperture 7, a U-shaped bar 10, having the forwardly projecting arms 11, which are provided with suitable apertures to receive the transverse bolt 9, having the head 8 and the nut 13, by means of which it is loosely mounted in the slots 9ᵃ of the arms 2. Upon the bolt 9, against the inner face of each arm 2, is mounted a bar or arm 38 which extends well toward the extremity of arms 2. Each of said arms 38 is provided with an aperture 17ᵃ adapted to receive its respective trunnion 17 upon an arm 25 of the pivoted yoke or clamp 22. In the outer end of each arm 2 is formed an aperture 18ᵃ to receive one of the trunnions 18, upon which the lever is pivotally connected with the socket 19 to which the hose pipe is engaged, by means of the usual screw threads 20, and the union 24.

About the member 10 is engaged a spring 12, each end of which is extended alongside an arm 38, with its terminal engaged in the recess 21, whereby the tension of the spring will cause said arms and clamp 22 to stand normally to the rear of the lever A, against the stop 15, as shown dotted in Fig. 2. Here the lever is thrown forwardly to allow the socket to be placed upon the open end of the faucet B, and in this movement the lug 26 of the clamp will strike the edge of the socket 19, causing the jaws 25 of the clamp to tilt forwardly on the trunnions 17, in readiness to engage the faucet. The lever will then be thrown rearwardly to the position shown in full lines, and as it moves back the clamp will engage the faucet above the flange 23, and it will be carried forwardly, with reference to the lever, on the circumference of a circle whose radius is indicated by the arms 38. As the clamp swings back between the arms of the lever, the arms 38 will carry the lever upwardly against the faucet and thus bind the pipe to which it is attached, firmly thereagainst, so that leakage can not occur at the point of union. The arms 38 will be limited in their forward movement by the stop 14, at a point slightly beyond the line of the pivotal supports 9 and 18, thereby holding the coupling in closed position, until removed by an external force, carrying the clamp rearwardly.

In cases where the coupling is likely to become disengaged a spring catch 16 may be fixed upon the arm 2 to engage the corresponding arm 38 as it is thrust to its rearward limit, which will hold the parts locked together until released by the operator by springing it from the line of movement of the arm, when the lever may be thrown forward and the coupling removed.

The bolt 9 has its bearing in slots 9ᵃ of the arms 2, whereby the arms carrying the clamp may be moved longitudinally therein by the adjustment of bolt 5, so that the coupling may be made to fit the varying sizes of faucets.

Figs. 4 and 5 show a modification in which the coupling is made to unite sections of hose pipe or the like; and to this end the transverse portion 29 of the lever is made U-shaped so as to encompass the section of pipe 27 to be united to that attached to the union. In this case a lug 31 is formed at each end of the portion 29, at the outer side of each arm 2ª; and each lug is provided with an aperture 31ª to receive the bolt 30, having the screw threads 32, for engagement therein. The end of this bolt passes through the aperture 34 of the block 33, where it is held by a swivel connection by the head 35. Each block 33 is provided with a shank 36 which passes through slot 39 in arm 2ª, to engage with arm 38, to which it is securely held by the nut 37. By the adjustment of screw bolt 30, the clamp 22 carried by the arms 38, may be adjusted to the desired position, when the coupling may be operated, as above described, by the handle 28.

It is obvious that other means may be employed for holding the clamp in working position, than the spring which is here shown, and other modifications may be adopted in the construction of the coupling, but all of which are within the spirit and scope of my invention.

Having thus described my invention, what I claim is—

1. A hose coupling comprising a union, trunnions formed thereon, a yoke-lever mounted to swing on said trunnions, a yoke adapted to engage a pipe section, pivotally mounted within the fork of said lever and an extension formed on said yoke adapted to bear against said union as the lever is operated, whereby the yoke is preserved in engaging position.

2. A hose coupling comprising a union, trunnions formed thereon, a yoke-lever mounted to swing on said trunnions, arms pivotally mounted within the fork of said lever the free ends being yieldingly held normally in advance thereof, a yoke adapted to engage a pipe section, pivotally mounted in the free ends of said arms, and an extension formed on the yoke adapted to bear against said union as the lever is operated, whereby the yoke is preserved in engaging position.

3. A coupling for uniting hose pipes with faucets and the like, comprising a union, trunnions formed thereon, a forked lever mounted on said trunnions, a clamp pivotally mounted between the forks of said lever, means for longitudinal adjustment of the clamp, means holding the clamp normally to the rear of the lever for engagement with the faucet when the lever is moved into engaging position, and means for locking the clamp in the lever, when in closed position.

4. Coupling for uniting hose pipes with faucets, and the like, comprising a union, trunnions formed thereon, a forked lever mounted on said trunnions, a clamp comprising a pair of arms pivoted between the forks of the lever, an open engaging member pivotally mounted at the forward end of said arms, means for preserving said member in working position, means holding the clamp normally to the rear of the lever for engagement with the faucet when the lever is moved into engaging position, and means for locking the clamp in the lever, when in closed position.

In testimony whereof I affix my signature in the presence of two witnesses.

JESSE G. POPPERT.

Witnesses:
 EDWIN E. HECKBERT,
 A. J. MATTER.

Copies of this patent may be obtained for five cents each, by addressing the "Commissioner of Patents Washington, D. C."